United States Patent
Driscoll et al.

(10) Patent No.: US 8,161,731 B2
(45) Date of Patent: Apr. 24, 2012

(54) SELECTIVE CATALYTIC REDUCTION USING CONTROLLED CATALYTIC DEACTIVATION

(75) Inventors: James Joshua Driscoll, Dunlap, IL (US); Wade J. Robel, Peoria, IL (US); Praveen S. Chavannavar, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 942 days.

(21) Appl. No.: 12/119,085

(22) Filed: May 12, 2008

(65) Prior Publication Data

US 2009/0277159 A1   Nov. 12, 2009

(51) Int. Cl.
*F01N 3/00* (2006.01)
*F01N 3/10* (2006.01)

(52) U.S. Cl. .............. 60/286; 60/276; 60/301
(58) Field of Classification Search ......... 60/286
See application file for complete search history.

(56) References Cited

U.S. PATENT DOCUMENTS

| | | | |
|---|---|---|---|
| 6,038,854 A | 3/2000 | Penetrante et al. | |
| 6,182,443 B1 | 2/2001 | Jarvis et al. | |
| 6,311,480 B1 | 11/2001 | Suzuki et al. | |
| 6,446,430 B1 | 9/2002 | Roth et al. | |
| 6,964,157 B2 | 11/2005 | Adelman et al. | |
| 7,134,273 B2 | 11/2006 | Mazur et al. | |
| 7,181,906 B2 | 2/2007 | Dalla Betta et al. | |
| 7,188,469 B2 | 3/2007 | Bonadies et al. | |
| 7,272,925 B2 | 9/2007 | Gross et al. | |
| 7,562,522 B2 | 7/2009 | Yan | |
| 2004/0040284 A1* | 3/2004 | Upadhyay et al. | 60/277 |
| 2004/0040289 A1* | 3/2004 | Mazur et al. | 60/295 |
| 2005/0223698 A1 | 10/2005 | Murata et al. | |
| 2005/0229589 A1 | 10/2005 | Murata et al. | |
| 2006/0130458 A1* | 6/2006 | Solbrig | 60/286 |
| 2006/0213187 A1* | 9/2006 | Kupe et al. | 60/286 |
| 2006/0236680 A1 | 10/2006 | Zhang et al. | |
| 2006/0263285 A1 | 11/2006 | Pollington et al. | |
| 2007/0031310 A1 | 2/2007 | Lee | |
| 2007/0151232 A1 | 7/2007 | Dalla Betta et al. | |
| 2007/0243115 A1* | 10/2007 | Tsumagari et al. | 422/168 |

FOREIGN PATENT DOCUMENTS

| | | |
|---|---|---|
| JP | 2000230414 | 8/2000 |
| JP | 2003531721 | 10/2003 |
| JP | 2007100510 A * | 4/2007 |
| WO | 0183087 | 11/2001 |

* cited by examiner

*Primary Examiner* — Thomas Denion
*Assistant Examiner* — Jason Shanske
(74) *Attorney, Agent, or Firm* — Finnegan, Henderson, Farabow, Garrett & Dunner LLP

(57) ABSTRACT

An exhaust treatment control system includes a controller configured to determine a value representative of a $NO_2$ concentration associated with an exhaust gas upstream of a selective catalytic reduction (SCR) catalyst, and determine a value representative of a NO concentration associated with the exhaust gas upstream of the SCR catalyst. The controller can also be configured to transmit a signal to at least partially control an injection of a hydrocarbon into the exhaust gas, wherein the hydrocarbon injection can occur upstream of an oxidation catalyst to at least partially decrease the $NO_2$ concentration of the exhaust gas downstream of the oxidation catalyst, and wherein the oxidation catalyst can be located upstream of the SCR catalyst.

16 Claims, 1 Drawing Sheet

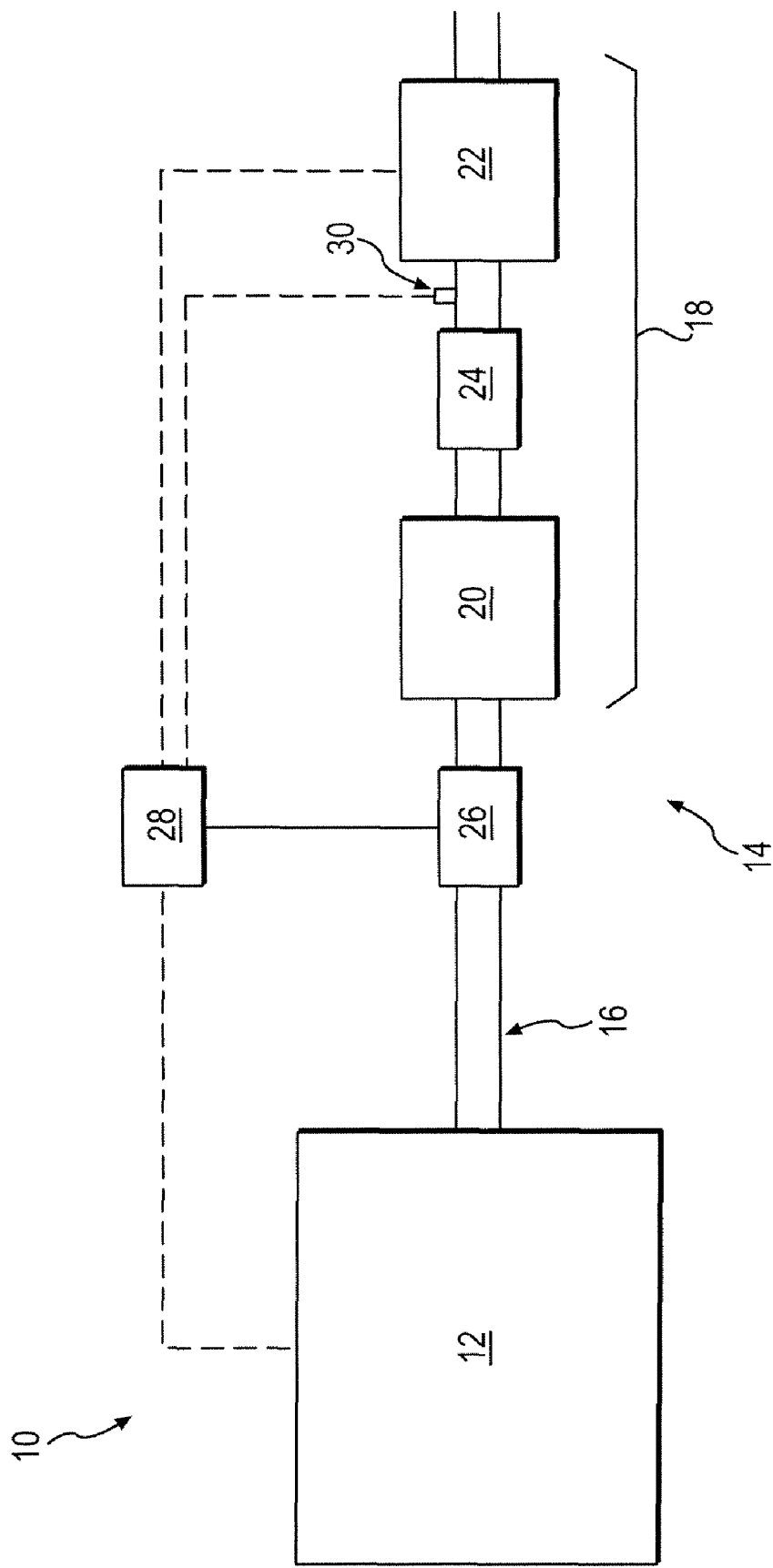

SELECTIVE CATALYTIC REDUCTION USING CONTROLLED CATALYTIC DEACTIVATION

TECHNICAL FIELD

The present disclosure is directed to an exhaust treatment system and, more particularly, to a selective catalytic reduction system using controlled catalytic deactivation.

BACKGROUND

Engines, including diesel engines, gasoline engines, gaseous fuel-driven engines, and other engines known in the art, traditionally exhaust a complex mixture of pollutants. These emissions may include gaseous and solid material, such as, particulate matter, nitrogen oxides (NOx), and sulfur compounds. Heightened environmental concerns have led regulatory agencies to increase the stringency of emission standards for such engines, forcing engine manufactures to develop systems to further reduce levels of engine emissions.

Various devices and methods can reduce emission levels, including after-treatment devices such as nitrogen oxide adsorbs, and diesel oxidation catalysts. These devices operate by reacting exhaust gases with a chemical catalyst to transform pollutants into less harmful products, such as, water, carbon dioxide, and nitrogen. One method for reducing exhaust emissions is selective catalytic reduction (SCR). During SCR, a catalyst facilitates a reaction between ammonia and NOx to produce water and nitrogen gas, thereby reducing the NOx concentration of the exhaust gas.

While SCR catalysts can reduce emission levels, they generally operate more efficiently when the exhaust gas has a ratio of concentrations of nitrogen dioxide ($NO_2$) to nitric oxide (NO) of about 1:1. However, engines output exhaust gases containing $NO_2$ and NO concentrations that vary depending on a number of parameters, such as exhaust temperature, engine speed, and engine load. Usually, an exhaust gas's $NO_2$ concentration is less than its NO concentration. To increase $NO_2$ concentration, and improve SCR performance, an oxidation catalyst can be placed upstream of the SCR catalyst. The oxidation catalyst can operate to convert a portion of NO in the exhaust gas to $NO_2$. While the oxidation catalyst can improve SCR performance at lower temperatures by providing an exhaust gas with a $NO_2$:NO ratio closer to 1:1, SCR performance at higher temperatures can be markedly less efficient if the $NO_2$ concentration exceeds the NO concentration of the exhaust gas.

One method for controlling exhaust gas emissions is disclosed in U.S. Patent Application Publication No. 2006/0236680 (hereinafter "the '680 application") of Zhang et al., published on Oct. 26, 2006. The '680 application describes an exhaust treatment system for regenerating diesel particulate filters. Specifically, the system of the '680 application injects fuel into an exhaust stream to reduce the capacity of an oxidation catalyst to oxidize NO to form $NO_2$. Additionally, more fuel may be added to the exhaust stream, raising its temperature, and permitting regeneration of a particulate filter.

Although the system of the '680 application may regenerate particulate filters, such a system is not suitable for use with an SCR catalyst. While the system of the '680 application seeks to reduce the concentration of $NO_2$ in an exhaust gas, an SCR catalyst requires an appropriate balance between $NO_2$ and NO concentrations for optimal performance.

The present disclosure is directed at overcoming one or more of the limitations in the prior art.

SUMMARY OF THE INVENTION

One aspect of the present disclosure is directed toward an exhaust treatment control system, including a controller configured to determine a value representative of a $NO_2$ concentration associated with an exhaust gas upstream of a selective catalytic reduction (SCR) catalyst, and determine a value representative of a NO concentration associated with the exhaust gas upstream of the SCR catalyst. The controller can also be configured to transmit a signal to at least partially control an injection of a hydrocarbon into the exhaust gas, wherein the hydrocarbon injection can occur upstream of an oxidation catalyst to at least partially decrease the $NO_2$ concentration of the exhaust gas downstream of the oxidation catalyst, and wherein the oxidation catalyst can be located upstream of the SCR catalyst.

Another aspect of the present disclosure is directed to an exhaust treatment system, including a hydrocarbon source configured to provide a hydrocarbon to an exhaust gas produced by a power source. The treatment system also includes an oxidation catalyst configured to receive the exhaust gas and located downstream of the hydrocarbon source, and an ammonia source configured to provide ammonia to the exhaust gas. Additionally, the treatment system can include a selective catalytic reduction (SCR) catalyst configured to receive the exhaust gas and located downstream of the oxidation catalyst and the ammonia source.

Another aspect of the present disclosure is directed to a machine, including a power source configured to produce an exhaust gas and a hydrocarbon source configured to provide a hydrocarbon to the exhaust gas. The machine can also include an oxidation catalyst configured to receive the exhaust gas and located downstream of the hydrocarbon source, and an ammonia source configured to provide ammonia to the exhaust gas. Additionally, the machine can include a selective catalytic reduction (SCR) catalyst configured to receive the exhaust gas and located downstream of the oxidation catalyst and the ammonia source.

Another aspect of the present disclosure is directed to a method of treating an exhaust gas, including providing a hydrocarbon to the exhaust gas upstream of an oxidation catalyst configured to receive the exhaust gas. The method can also include decreasing a $NO_2$ concentration of the exhaust gas downstream of the oxidation catalyst to provide a $NO_2$:NO concentration ratio of about 1:1.

BRIEF DESCRIPTION OF THE DRAWINGS

The accompanying drawings, which are incorporated in and constitute a part of this specification, illustrate exemplary embodiments of the disclosure and, together with the written description, serve to explain the principles of the disclosed system.

FIG. 1 provides a schematic representation of a machine including a power source, according to an exemplary disclosed embodiment.

DETAILED DESCRIPTION

FIG. 1 provides a schematic representation of a machine 10 including a power source 12, wherein power source 12 can include any type of internal combustion engine. For example, power source 12 could be configured to operate with any type of fuel, including diesel, gasoline, ethanol, gaseous fuel, bio-fuel, or any other fuel type or combination of fuels. Further, power source 12 may be configured to provide power to an on-highway vehicle, construction or mining equipment, a factory or power plant, or any other type of mobile or stationary machine known in the art.

Machine 10 can include various components configured to reduce emission levels of exhaust gases produced by power source 12. As described in detail below, the operation of a catalyst or other exhaust component can be regulated via electronic control. For example, machine 10 can include an exhaust system 14 configured to treat exhaust gas produced by power source 12. Other subsystems could include a fuel system, an air induction system, a lubrication system, a cooling system, or any other appropriate systems (not shown).

Exhaust system 14 can be configured to receive an exhaust gas produced by power source 12. Specifically, exhaust system 14 can include an exhaust passage 16 fluidly connected to power source 12. Exhaust system 14 can also include one or more after-treatment devices 18 fluidly connected to exhaust passage 16, and configured to remove or reduce pollutants in the exhaust gas prior to release into the atmosphere.

After-treatment devices 18 can include various filters, catalysts, or other devices, such as, for example, an oxidation catalyst 20 and a selective catalytic reduction (SCR) catalyst 22. In some embodiments, an ammonia-oxidizing catalyst (not shown) may be added downstream to reduce the levels of ammonia contained in the exhaust gas. Further, exhaust system 14 can include one or more heaters (not shown) configured to heat one or more after-treatment devices 18.

Exhaust system 14 could also include a filter (not shown) configured to trap particulate matter contained in the exhaust gas, such as, for example, a diesel particulate filter (DPF). The filter medium may include a mesh-like material, a porous ceramic material, fiber mats, or any other material or configuration suitable for trapping particulate matter. Also, the filter can be manufactured from a variety of materials including cordierite, silicon carbide, and other high temperature oxide ceramics.

Oxidation catalyst 20 can be configured to receive a flow of exhaust gas produced by power source 12. In particular, oxidation catalyst 20 could be configured to convert a portion of nitric oxide (NO) to nitrogen dioxide ($NO_2$). One or more oxidation catalysts 20 may be added to exhaust system 14 to at least partially affect a concentration of various oxides of nitrogen, as other downstream catalysts may function more effectively at certain oxide ratios. For example, SCR catalyst 22 may operate more efficiently with an exhaust gas having a $NO_2$:NO concentration ratio of about 1:1. Under such operating conditions, SCR catalyst 22 may optimally reduce emission levels of an exhaust gas produced by power source 12.

Further, oxidation catalyst 20 can include any catalyst configured to oxidize an exhaust gas constituent, such as, for example, hydrocarbons, carbon monoxide, or NOx, to form a less noxious product. In some embodiments, oxidation catalyst 20 can include a diesel oxidation catalyst. Such a device can include any suitable catalytic material, such as, for example, platinum, aluminum, palladium, rhodium, barium, cerium, alkali metals, alkaline-earth metals, rare-earth metals, or combinations thereof.

Oxidation catalyst 20 could also include a variety of designs, materials, or structures configured to capture particulate matter by physical filtration. Specifically, oxidation catalyst 20 can include any type of trap or similar device configured to retain various solid combustion products produced by power source 12, such as, soot, ash, or unburned hydrocarbons. For example, oxidation catalyst 20 can include a catalytic diesel particulate filter. Oxidation catalyst 20 can also include a partial filter designed to trap, for example, about 60% of particulate matter.

In some embodiments, SCR catalyst 22 can be located downstream of oxidation catalyst 20 and configured to receive a flow of exhaust gas. SCR catalyst 22 can be configured to facilitate a chemical reaction involving constituents of the exhaust gas. For example, SCR catalyst 22 can include a NOx-reducing catalyst configured to facilitate a reaction between ammonia and NOx to at least partially remove NOx from the exhaust gas flow.

SCR catalyst 22 can include a catalytic medium having a material configured to react with one or more constituents of the exhaust gas. The material can be formed from sintered metallic particles such as, for example, aluminum, titanium, platinum, or any other high-temperature alloy. The material can also be formed from ceramic particles including, silicon carbide, cordierite, mullite, or any other ceramic particles known in the art. Formation of the material can be achieved using a casting process, an injection molding process, or any other process that produces a porous material with a desired porosity. SCR catalyst 22 can include one or more substrates coated with a catalyst, such as, for example, a precious metal-containing washcoat. The washcoat can include platinum, vanadia, titania, or zeolite configured to operate over a range of exhaust temperatures, and may be formed as an irregular surface on a porous substrate to increase the reactive surface area of the catalyst.

To operate efficiently, SCR catalyst 22 can require sufficient ammonia to react with NOx to reduce NOx levels. However, power source 12 operating under lean combustion conditions can produce exhaust gas containing relatively low levels of ammonia. To operate more efficiently, SCR catalyst 22 may require additional ammonia to facilitate a more complete reaction between ammonia and NOx. To provide additional ammonia to SCR catalyst 22, an ammonia source 24 may be fluidly connected to exhaust passage 16 and located upstream of SCR catalyst 22. In some embodiments, ammonia source 24 may require a heater, cooler, thermal insulation, or other similar device (not shown) configured to maintain a suitable ammonia temperature, such as, to prevent freezing.

Ammonia source 24 can include any device or system configured to provide ammonia to an exhaust flow produced by power source 12. For example, ammonia source 24 could provide direct injection of urea into the exhaust flow, which is readily converted to ammonia. Ammonia may also be produced by a reaction between NOx and other substances in exhaust gas produced by power source 12. Specifically, ammonia may be produced by reacting NOx with a variety of other combustion byproducts, such as, $H_2$ (hydrogen gas), $C_3H_6$ (propene), or CO (carbon monoxide).

Ammonia source 24 could also include an ammonia-producing catalyst configured to convert at least a portion of the exhaust gas into ammonia. The ammonia-producing catalyst can be made from a variety of materials, such as, for example, platinum, palladium, rhodium, iridium, copper, chrome, vanadium, titanium, iron, or cesium. Combinations of these materials may be used, and the catalyst material may be chosen based on the type of fuel used, the air to fuel-vapor ratio desired, or for conformity with environmental standards.

To improve the efficiency of SCR catalyst 22, an exhaust gas entering SCR catalyst 22 should contain a $NO_2$:NO concentration ratio of about 1:1. Under some operating conditions, exhaust gas entering SCR catalyst 22 can contain a $NO_2$:NO concentration ratio greater than 1:1. To reduce the $NO_2$:NO concentration ratio, the efficiency of oxidation catalyst 20 can be reduced by adding suitable compounds to "poison" catalytic sites of oxidation catalyst 20. Specifically, hydrocarbons can be introduced into the exhaust gas upstream of oxidation catalyst 20 to occupy catalytic sites within the catalytic material of oxidation catalyst 20, thereby reducing the ability of oxidation catalyst 20 to convert NO to $NO_2$. By reducing the $NO_2$ concentration of the exhaust gas entering SCR catalyst 22, the performance of SCR catalyst 22 can be improved by providing it with exhaust gas having a $NO_2$:NO concentration ratio of about 1:1.

In some embodiments, a hydrocarbon can be supplied to oxidation catalyst 20 by a hydrocarbon source 26. For example, hydrocarbon source 26 can be positioned upstream of oxidation catalyst 20 and fluidly connected to exhaust passage 16. Hydrocarbon source 26 can be configured to supply a hydrocarbon to exhaust passage 16 or oxidation catalyst 20. Further, hydrocarbon source 26 or exhaust passage 16 can include various components or systems configured to sufficiently mix the hydrocarbons with the exhaust gas to provide a generally even distribution of hydrocarbon-containing exhaust gas flow into oxidation catalyst 20.

In some embodiments, hydrocarbon source 26 can be controlled by a controller 28. One or more commercially available microprocessors can be configured to perform one or more functions of controller 28. Also, one or more operations of controller 28 could be performed by a general engine microprocessor, or a microprocessor capable of controlling other functions of machine 10. Controller 28 can further include a memory, a secondary storage device, a processor, or any other components required to operate. Other circuits may also be associated with controller 28, such as power supply circuitry, signal conditioning circuitry, solenoid driver circuitry, and other types of circuitry.

Controller 28 can be configured to at least partially control an injection of a hydrocarbon into an exhaust gas produced by power source 12. In some embodiments, controller 28 can be configured to provide continuous or intermittent control to regulate hydrocarbon injection. For example, controller 28 may be configured to transmit a signal to at least partially control a hydrocarbon injection into an exhaust gas to at least partially reduce a $NO_2$ concentration of the exhaust gas downstream of oxidation catalyst 20. Such a signal may operate to affect a valve, a solenoid, or other device (not shown) configured to permit an injection of a hydrocarbon from hydrocarbon source 26 into oxidation catalyst 20.

In some embodiments, controller 28 may also be configured to determine a value representative of a concentration of an exhaust gas constituent produced by power source 12. For example, controller 28 could be configured to determine a value representative of $NO_2$ or NO concentration. Such representative values could be determined using a predicted value, an algorithm, or a sensor input. For example, a predicted value could be based on a look-up table, modeled, or empirical data. An algorithm may use various parameters, such as, engine speed, load, or injection timing, to calculate a value. In some embodiments, based on such a determination, controller 28 could be configured to transmit a signal to hydrocarbon source 26.

Controller 28 may further be configured to receive or transmit a signal from, or to, one or more components of machine 10, such as, for example, power source 12 or exhaust system 14. In some embodiments, controller 28 could be configured to transmit a signal to power source 12 to affect an operation of power source 12. For example, a signal may modify an engine operating parameter, such as fuel injection, engine speed, valve timing, or engine load. In particular, a signal may modify fuel injection or valve timing of power source 12 to increase hydrocarbon concentration of an exhaust gas flowing into oxidation catalyst 20, thereby decreasing $NO_2$ production. These and other parameters could be modified to at least partially control the composition of exhaust gas produced by power source 12.

Controller 28 can also be configured to receive a signal representative of a parameter associated with one or more components of exhaust system 14. For example, a signal representative of a NOx concentration in the exhaust gas upstream of SCR catalyst 22 can be received by controller 28. In operation, a sensor 30 may be located and configured to output a signal associated with an exhaust gas upstream of SCR catalyst 22. In other embodiments, sensor 30 can be associated with exhaust passage 16 or another component of exhaust system 14. For example, sensor 30 could be located upstream of oxidation catalyst 20 or downstream of SCR catalyst 22. In other embodiments, a sensor (not shown) could be located within oxidation catalyst 20 or SCR catalyst 22.

Sensor 30 can include any suitable type of electrical or chemical sensor configured to measure a parameter associated with power source 12 or exhaust system 14, such as, for example, exhaust gas constituent concentration, exhaust gas temperature, exhaust gas flow rate, engine speed, engine load, or catalyst temperature. Such a signal can be sent continuously, intermittently, or when requested by controller 28. In particular, sensor 30 may be a NOx sensor configured to determine NOx concentration of exhaust gas upstream of SCR catalyst 22.

In some embodiments, controller 28 can be configured to perform a calculation to convert a received signal into a value representative of a concentration of an exhaust gas constituent. For example, the signal may include a current or voltage reading received from sensor 30 mounted within exhaust passage 16 and upstream of SCR catalyst 22. Also, controller 28 could use other sensory inputs, including inputs associated with various exhaust gas parameters, such as, for example, temperature, flow rate, or pressure. Controller 28 could receive and analyze such inputs to derive a representative concentration value. In other embodiments, controller 28 could compare a signal from sensor 30 to another signal received from a separate sensor (not shown) located on another part of machine 10, to determine a value representative of concentration of an exhaust gas constituent.

INDUSTRIAL APPLICABILITY

The present disclosure provides a selective catalytic reduction using controlled catalytic deactivation. Specifically, the disclosed system and method can controllably regulate the composition of an exhaust gas flowing into an SCR catalyst. This SCR system may be used to reduce emission levels produced by an internal combustion engine. The disclosed exhaust treatment system may reduce or eliminate the need for inefficient, expensive, and unreliable exhaust treatment devices.

As outlined above, SCR catalysts generally operate more efficiently within a limited range of $NO_2$:NO concentration ratios. However, $NO_2$ and NO concentrations of exhaust gases can vary significantly at different engine operating conditions. In order to improve SCR efficiency over a range of engine operating conditions, the $NO_2$:NO concentration ratio of an exhaust gas flowing into SCR catalyst 22 should be generally maintained at about 1:1.

Controller 28 of the present disclosure can be configured to at least partially control the composition of exhaust gas flowing into one or more after-treatment devices 18, such as SCR catalyst 22 or oxidation catalyst 20. Specifically, controller 28 can at least partially control the operation of hydrocarbon source 26 or power source 12 to affect the composition of an exhaust gas flowing into SCR catalyst 22. Hydrocarbon injected into the exhaust gas upstream of oxidation catalyst 20 may come to occupy some catalytic sites of oxidation catalyst 20, thereby partially reducing its catalytic performance and affecting downstream exhaust gas composition.

In some embodiments, controller 28 could also monitor a concentration of one or more constituents of an exhaust gas produced by power source 12. For example, a low NO concentration relative to $NO_2$ concentration could indicate that SCR catalyst 22 was not operating at an optimal $NO_2$:NO concentration ratio, and consequently emission levels may be too high. If controller 28 received a signal from NO sensor 30 indicating a low NO level, controller 28 could then transmit a signal to hydrocarbon source 26 to inject hydrocarbons into the exhaust gas upstream of oxidation catalyst 20. The hydrocarbons could then occupy sites within oxidation catalyst 20, reducing the concentration of $NO_2$ produced by oxidation catalyst 20. Consequently, the $NO_2$:NO concentration flowing into SCR catalyst 22 may be restored to about 1:1.

It will be apparent to those skilled in the art that various modifications and variations can be made in the disclosed system without departing from the scope of the disclosure. Other embodiments will be apparent to those skilled in the art from consideration of the specification disclosed herein. It is intended that the specification and examples be considered as exemplary only, with a true scope being indicated by the following claims and their equivalents.

What is claimed is:

1. An exhaust treatment control system, comprising:
a controller configured to:
  determine a value representative of a $NO_2$ concentration associated with an exhaust gas upstream of a selective catalytic reduction (SCR) catalyst that is configured to react with the exhaust gas and ammonia;
  determine a value representative of a NO concentration associated with the exhaust gas upstream of the SCR catalyst; and
  transmit a signal to at least partially control an injection of a hydrocarbon from a hydrocarbon injection source different from an ammonia source into the exhaust gas, the hydrocarbon reacting with an oxidation catalyst to cause a concentration ratio of NO:$NO_2$ of the exhaust gas to be generally 1:1 downstream of the oxidation catalyst and upstream of the SCR catalyst.

2. The control system of claim 1, wherein the oxidation catalyst includes at least one of a diesel oxidation catalyst, and a catalytic diesel particulate filter.

3. The control system of claim 1, wherein the hydrocarbon includes at least one of diesel, gasoline, ethanol, gaseous fuel, and bio-fuel.

4. The control system of claim 1, wherein the controller is configured to determine a value representative of a concentration of an exhaust gas constituent based on at least one of a sensor input, an algorithm, and a predicted value.

5. The control system of claim 1, wherein the controller is further configured to transmit or receive a signal associated with an engine operating parameter.

6. An exhaust treatment system, comprising:
a hydrocarbon source configured to provide a hydrocarbon to a flow of exhaust gas;
an oxidation catalyst configured to receive the flow of exhaust gas and located downstream of the hydrocarbon source;
a controller configured to control an amount of hydrocarbon injected from the hydrocarbon source into the flow of exhaust gas to cause a concentration ratio of NO:$NO_2$ of the exhaust gas downstream of the oxidation catalyst to be generally 1:1;
an ammonia source configured to provide ammonia to the flow of exhaust gas; and
a selective catalytic reduction (SCR) catalyst configured to receive the flow of exhaust gas having the concentration ratio of NO:$NO_2$ of generally 1:1, the SCR located downstream of the oxidation catalyst and the ammonia source.

7. The treatment system of claim 6, wherein the oxidation catalyst includes at least one of a diesel oxidation catalyst, and a catalytic diesel particulate filter.

8. The treatment system of claim 6, wherein the hydrocarbon source includes a supply of at least one of diesel, gasoline, ethanol, gaseous fuel, and bio-fuel.

9. The treatment system of claim 6, wherein the controller is configured to determine a value representative of a concentration of an exhaust gas constituent based on at least one of a sensor input, an algorithm, and a predicted value.

10. The treatment system of claim 6, wherein the controller is further configured to transmit or receive a signal associated with an engine operating parameter.

11. A machine, comprising:
a power source configured to produce an exhaust gas;
a hydrocarbon source configured to supply hydrocarbon to the exhaust gas;
an oxidation catalyst configured to receive the exhaust gas and located downstream of the hydrocarbon source;
an ammonia source configured to supply ammonia to the exhaust gas; and
a selective catalytic reduction (SCR) catalyst configured to receive the exhaust gas and located downstream of the oxidation catalyst and the ammonia source; and
a controller configured to control an amount of hydrocarbon injected into the flow of exhaust gas to cause a concentration ratio of NO:$NO_2$ of the exhaust gas downstream of the oxidation catalyst and upstream of the SCR catalyst to be generally 1:1.

12. The machine of claim 11, wherein the oxidation catalyst includes at least one of a diesel oxidation catalyst, and a catalytic diesel particulate filter.

13. The machine of claim 11, wherein the hydrocarbon source includes at least one of diesel, gasoline, ethanol, gaseous fuel, and bio-fuel.

14. The machine of claim 11, wherein the controller is configured to determine a value representative of a concentration of an exhaust gas constituent based on at least one of a sensor input, an algorithm, and a predicted value.

15. The machine of claim 11, wherein the controller is further configured to transmit or receive a signal associated with an engine operating parameter.

16. A method of treating an exhaust gas, comprising:
controlling an amount of a hydrocarbon injected from a source into the exhaust gas so that the hydrocarbon reacts with an oxidation catalyst to provide an exhaust gas downstream of the oxidation catalyst having a NO:$NO_2$ concentration ratio of about 1:1;
receiving the exhaust gas having the NO:$NO_2$ concentration ratio of about 1:1 in a selective catalytic reduction (SCR) catalyst; and
providing ammonia, from a source different than the source providing the hydrocarbon, to the SCR catalyst to cause a reaction among the SCR catalyst, the ammonia, and the exhaust gas.

* * * * *